United States Patent [19]

Kojima et al.

[11] Patent Number: 4,686,584
[45] Date of Patent: Aug. 11, 1987

[54] VIDEO SIGNAL REPRODUCTION APPARATUS AND METHOD HAVING NOISE REDUCTION FOR FAST VIDEO REPRODUCTION

[75] Inventors: Masanori Kojima; Masaharu Hayakawa, both of Nagaokakyo, Japan

[73] Assignee: Mitsubishi Denki Kabushiki Kaisha, Tokyo, Japan

[21] Appl. No.: 664,881

[22] Filed: Oct. 25, 1984

[30] Foreign Application Priority Data

Nov. 29, 1983 [JP] Japan ................................. 58-227205

[51] Int. Cl.4 ........................ H04N 5/783; H04N 5/93
[52] U.S. Cl. .................... 360/10.3; 358/312; 360/37.1; 360/38.1
[58] Field of Search ..................... 360/10.1, 10.3, 33.1, 360/37.1, 38.1, 64, 11; 358/312

[56] References Cited

U.S. PATENT DOCUMENTS 3,662,101  5/1972  Segerstrom ......................... 360/10.3
4,283,737  8/1981  Nikami ............................. 360/10.3
4,445,145  4/1984  Moriya ............................. 360/10.3
4,463,390  7/1984  Koga et al. ........................ 360/10.3
4,492,988  1/1985  Hashimoto et al. ................. 360/38.1

FOREIGN PATENT DOCUMENTS 0053982  4/1980  Japan ................................. 360/10.3

Primary Examiner—Raymond F. Cardillo
Assistant Examiner—Robert A. Weinhardt
Attorney, Agent, or Firm—Lowe Price LeBlanc Becker & Shur

[57] ABSTRACT

A magnetic video reproducing apparatus employs a rotating two-head system, a helical scanning system and an azimuth system, and is capable of reproducing a video signal recorded in a recording medium at a high speed faster than the recording speed. The output side of a reproducing circuit (24) is connected with a delay circuit (31) for delaying a reproduced composite video signal for the period of about one field. The output directly generated from the reproducing circuit (24) and the output delayed by the delay circuit (31) for the period of about one field are switched by a changeover switch (32) at predetermined timing. Since, in fast reproducing operation, noises appear in the signal for predetermined periods within one field, the changeover switch (32) is so switched as to output the signal delayed for the period of one field including no noises during the subject periods. Such switching operation is performed by a vertical synchronizing signal separation circuit (33) for separating a vertical synchronizing signal included in the composite video signal, at regular intervals in synchronization with the signal.

7 Claims, 5 Drawing Figures

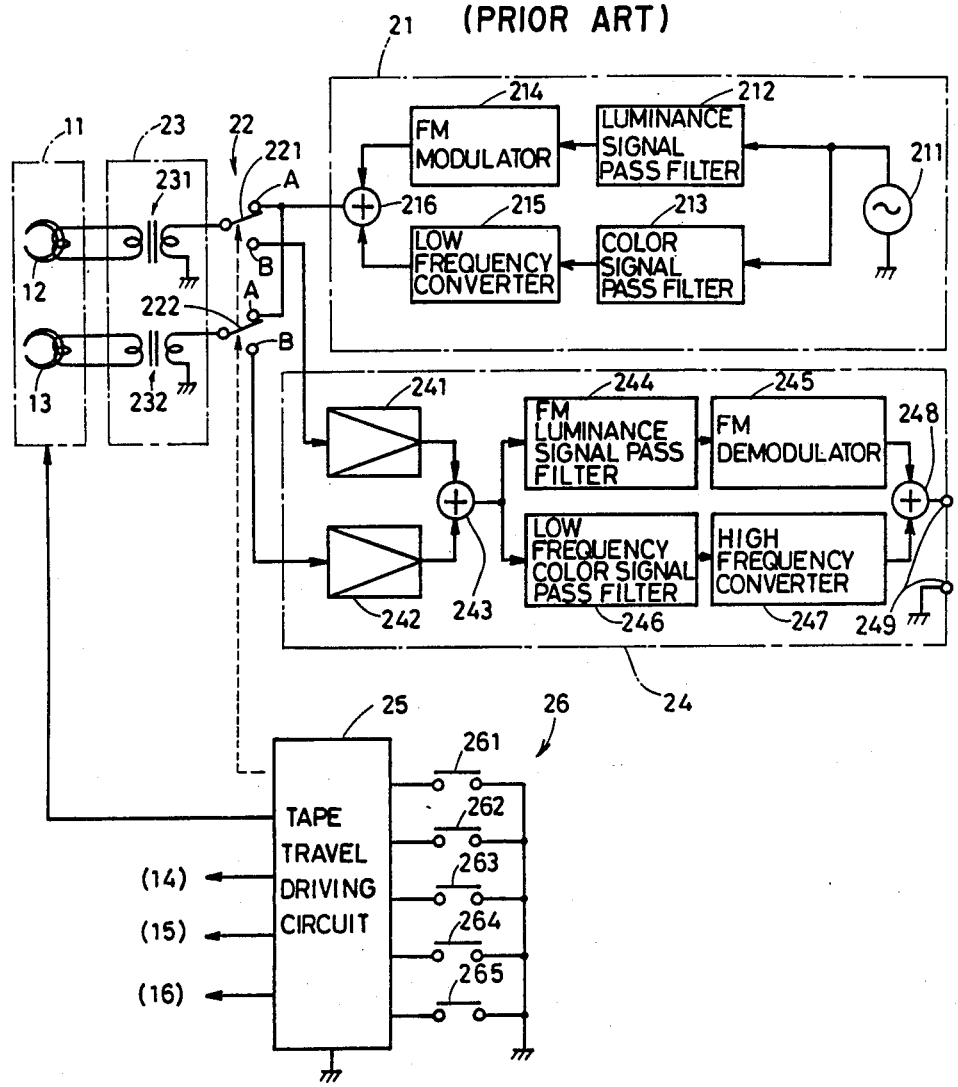

VIDEO SIGNAL REPRODUCTION APPARATUS AND METHOD HAVING NOISE REDUCTION FOR FAST VIDEO REPRODUCTION

BACKGROUND OF THE INVENTION

1. Field of the Invention

The present invention relates to a magnetic video reproducing apparatus. More particularly, it relates to a magnetic video reproducing apparatus which is so improved as to maintain excellent quality of reproduced pictures when reproduction is made at a speed several times faster than the recording speed.

2. Description of the Prior Art

In a conventional home magnetic video reproducing apparatus and a magnetic video recording/reproducing apparatus having a picture recording function, there are generally employed a rotating head system, a helical scanning system and an azimuth system. In the rotating head system, e.g., two video heads are mounted on the circumference of a rotating drum to be separated from each other at an angle of 180°. In the helical scanning system, a magnetic tape is made to travel aslant with respect to the video heads. In the azimuth system, gaps of the two video heads are provided at angles different from each other, so that angles of video signals recorded in the magnetic tape vary with the video heads.

These three systems are disclosed in detail in, e.g., U.S. Pat. No. 4,463,390 issued on July 31, 1984 to Yoshio Koga et al.

The present invention is directed to an improvement in a magnetic video reproducing apparatus employing the above three systems.

FIG. 1 is illustrative of a video recording/reproducing portion of a conventional magnetic video reproducing apparatus and a magnetic tape in which video signals are recorded by the conventional video recording portion. Referring to FIG. 1, a video recording portion 10 includes a head drum 11 rotatably provided at a position in the travelling path of the magnetic tape. The head drum 11 is provided on its circumference with two video heads 12 and 13 which are separated at an angle of 180° from each other for recording and/or reproducing video signals. Slantingly guided along the head drum 11 is a magnetic tape 1 which is wound around a supply reel 14 and a take-up reel 15, to implement the helical scanning system in which the magnetic tape 1 travels aslant with respect to the direction of rotation of the video heads 12 and 13, i.e., the direction of rotation of the head drum 11. In the vicinity of the take-up reel 15, there are provided a capstan 16 and a pinch roller 17 with interposition of the magnetic tape 1 therebetween.

Thus, in the magnetic video reproducing apparatus employing the helical scanning system, magnetic patterns of the video signals to be recorded in the magnetic tape 1 are as shown in FIG. 1. Further, when the video signals are recorded by, e.g., the VHS system, recording is made with a recorded A track 2 and a B track 3 in process of recording at azimuth angles of, e.g., 6° and −6° respectively. In FIG. 1, symbol X indicates the direction of travelling of the magnetic tape 1 and symbol Y indicates the direction of rotation of the video heads 12 and 13.

FIG. 2 is a circuit diagram of a conventional magnetic video reproducing apparatus. In structure, the conventional magnetic video reproducing apparatus includes a head drum 11 having video heads 12 and 13, a rotary transformer assembly 23 coupled with the head drum 11, a recording system block 21, a reproducing system block 24, a head changeover switch assembly 22 for performing switching operation between the recording system block 21 and the reproducing system block 24 with respect to the rotary transformer assembly 23, a tape travel driving circuit 25 and a mode selection switch assembly 26. The recording system block 21 includes a video signal source 211 for generating video signals, a luminance signal pass filter 212 for separating luminance signals from the video signals, a color signal pass filter 213 for separating color signals from the video signals, an FM modulator 214 for performing FM modulation of the luminance signals, a low frequency converter 215 for performing low frequency conversion of the color signals and an adder 216 for adding up modulated or converted luminance signals and color signals. The reproducing system block 24 includes head amplifiers 241 and 242 for amplifying signals detected by the respective video heads 12 and 13, an adder 243 for adding up the outputs from the head amplifiers 241 and 242, an FM video signal pass filter 244 for separating luminance signals from the added signals, an FM demodulator 245 for performing FM demodulation, a low frequency color signal pass filter 246 for separating color signals from the added signals, a high frequency converter 247 for performing high frequency conversion, an adder 248 and an output terminal 249. The mode selection switch assembly 26 is coupled to the tape travel driving circuit 25, and includes a recording command switch 261, a reproduction command switch 262, a stoppage command switch 263, a fast reproduction command switch 264 and a temporary stoppage command switch 265. Each of these switches 261 to 265 is adapted to supply the tape travel driving circuit 25 with the subject command when the same is turned on. The tape travel driving circuit 25 drives and controls the head drum 11, the supply reel 14, the take-up reel 15, the capstan 16 and the head changeover switch assembly 22 based on outputs from the aforementioned mode selection switch assembly 26.

Referring to FIGS. 1 and 2, operation of the conventional magnetic video reproducing apparatus is now described.

First, explanation is made with respect to signal processing in a recording mode. When the recording command switch 261 of the mode selection switch assembly 26 is turned on, the magnetic video reproducing apparatus is brought in the recording mode, in which switches 221 and 222 respectively included in the head changeover switch assembly 22 are switched upwardly, i.e., toward contacts A in FIG. 2 by the tape travel driving circuit 25, so that the head drum 11 and the capstan 16 etc. are driven at a predetermined recording speed. A video signal generated from the video signal source 211 consist of a luminance signal of up to about 3 MHz and a color signal of 3.58 MHz. The luminance signal includes horizontal synchronizing signals and vertical synchronizing signals, and the color signal includes color-burst signals. The luminance signal passes through the luminance signal pass filter 212 to be supplied to the FM modulator 214. The FM modulator 214 modulates the luminance signal to an FM signal of 3.4 MHz to 4.4 MHz, which is supplied to the adder 216. On the other hand, the color signal passes through the color signal pass filter 213 to be supplied to the low frequency converter 215. The low frequency converter 215 converts the color signal into signal of 629 KHz, to supply the same to the adder 216. The adder 216 adds up the FM-modulated luminance signal and the low-frequency converted color signal. The added signal, i.e., the frequency-modulated video signal is supplied to the video head 12 through the switch 221 included in the head changeover switch assembly 22 and a transformer 231 included in the rotary transformer assembly 23, as well as to the video head 13 through the switch 222 and a transformer 232 included in the rotary transformer assembly 23. The video head 12 records the modulated video signal, i.e., the luminance signal and the color signal on the A track 2, while the video head 13 records the modulated video signal on the B track 3.

Explanation is now made on signal processing in a reproducing mode. In a normal reproducing mode, the reproduction command switch 262 in the mode selection switch assembly 26 is pushed down to be on. In response, the tape travel driving circuit 25 switches the respective switches 221 and 222 included in the head changeover switch assembly 22 downwardly in FIG. 2, i.e., toward contacts B to switch to the reproducing mode and drives the head drum 11 and the capstan 16 etc. in a similar manner to the recording mode.

The recorded signal, i.e., the video signal recorded on the A track 2 of the magnetic tape 1 is selected by the azimuth angle to be read by the video head 12, and is supplied to the head amplifier 241 through the transformer 231 and the switch 221. The head amplifier 241 amplifies the reproduced signal to supply the same to the adder 243. Similarly, the recorded signal recorded on the B track 3 of the magnetic tape 1 is read by the video head 13, to be supplied to the head amplifier 242 through the transformer 232 and the switch 222. The head amplifier 242 amplifies the reproduced signal to supply the same to the adder 243.

The adder 243 adds up the reproduced signals on the A track 2 and the B track 3, to supply the same to the FM luminance signal pass filter 244 and the low frequency color signal pass filter 246. The FM luminance signal pass filter 244 passes the FM luminance signal within the frequency range modulated by the FM modulator 214 alone, to supply the same to the FM demodulator 245. The FM demodulator 245 demodulates the FM luminance signal to extract luminance signal, which is supplied to the adder 248. On the other hand, the low frequency color signal pass filter 246 passes the low frequency color signal within the frequency range converted by the low frequency converter 216 alone, to supply the same to the high frequency converter 247. The high frequency converter 247 converts the low frequency color signal into the color signal of 3.58 MHz, to supply the same to the adder 248. The adder 248 adds up the demodulated luminance signal and the color signal, to output a reproduced composite video signal to the output terminal 249.

Fast reproducing operation is now explained. In the fast reproducing operation, the capstan 16 is rotated by the tape travel driving circuit 25 at a speed in a predetermined multiple of the recording speed, e.g., by four times according to operation of the fast reproduction command switch 264. Consequently, the magnetic tape 1 travels at a speed, e.g., four times faster than the tape travelling speed in the recording operation, and the video heads 12 and 13 cannot trace certain tracks, to successively miss the tracks. When, it is assumed that the A tracks and the B tracks are alternately arranged, for example, and the video head 12 misses a B track for shifting from an A track to the following A track and the video head 13 misses an A track for shifting from a B track to the following B track, the outputs of the video heads 12 and 13 are lowered, followed by lowering of the outputs of the adder 243 which adds up the outputs from the head amplifiers 241 and 242, whereby noises appear in the reproduced composite video signals and on the screen 100 of a monitor television.

Further detailed explanation is made with reference to FIG. 3. FIG. 3 illustrates relation between the video signal before demodulation, i.e., the output from the adder 243 (see FIG. 2), the reproduced composite video signal, i.e., the output from the adder 248 and the noises appearing on the monitor screen 100. The ordinate in FIG. 3 represents passage of time, which passes downwardly from the upper part. As described above, when, for example, the video head 12 misses the B track for shifting from an A track to the following A track and the video head 13 misses the A track for shifting from a B track to the following B track, the outputs thereof are lowered such that noises 103 appear in the outputs of the adder 243. Thus, the noises 103 also appear in the reproduced composite video signal, i.e., the output from the adder 248 generated by demodulation of the subject output of the adder 243. In the output from the adder 248 as shown in FIG. 3, the video signal portion is indicated by the reference numeral 104 and the synchronizing signal portion is indicated by the reference numeral 105. Since the reproduced composite video signal outputted from the adder 248 is displayed on the monitor screen 100, the noises 103 appear on the same as, e.g., three screen noises 200 in the upper, middle and lower portions of the screen 100. Thus, the picture displayed on the monitor screen 100 are blurred when the same are reproduced at a high speed.

SUMMARY OF THE INVENTION

An object of the present invention is to provide a novel magnetic video reproducing apparatus which is so improved as to reduce or eliminate noises appearing upon a fast reproducing operation.

According to the present invention, briefly stated, there is provided a magnetic video reproducing apparatus in which a delay circuit is newly provided for delaying a reproduced composite video signal outputted from a reproducing circuit for a predetermined period of time, with further provision of switching means for appropriately selecting the reproduced composite video signal directly outputted from the reproducing circuit and the reproduced composite video signal delayed in the delay circuit at regular intervals in synchronization with vertical synchronizing signal included in the reproduced composite video signal and in relation to a reproducing speed in a fast reproducing operation, thereby to extract the signal to an output terminal.

Since, according to the present invention, the reproduced composite video signal to appear at the output terminal is thus appropriately switched to those directly outputted from the reproducing circuit and to those delayed for a predetermined period of time by the delay circuit, noises to appear in the reproduced composite video signal generated from the output terminal can completely be eliminated or reduced. Consequently, the reproduced pictures can be clearly seen on a screen of the magnetic video reproducing apparatus upon fast reproducing operation.

The above and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a circuit diagram of the conventional magnetic video reproducing apparatus;

DESCRIPTION OF THE PREFERRED EMBODIMENTS

Figure 4:
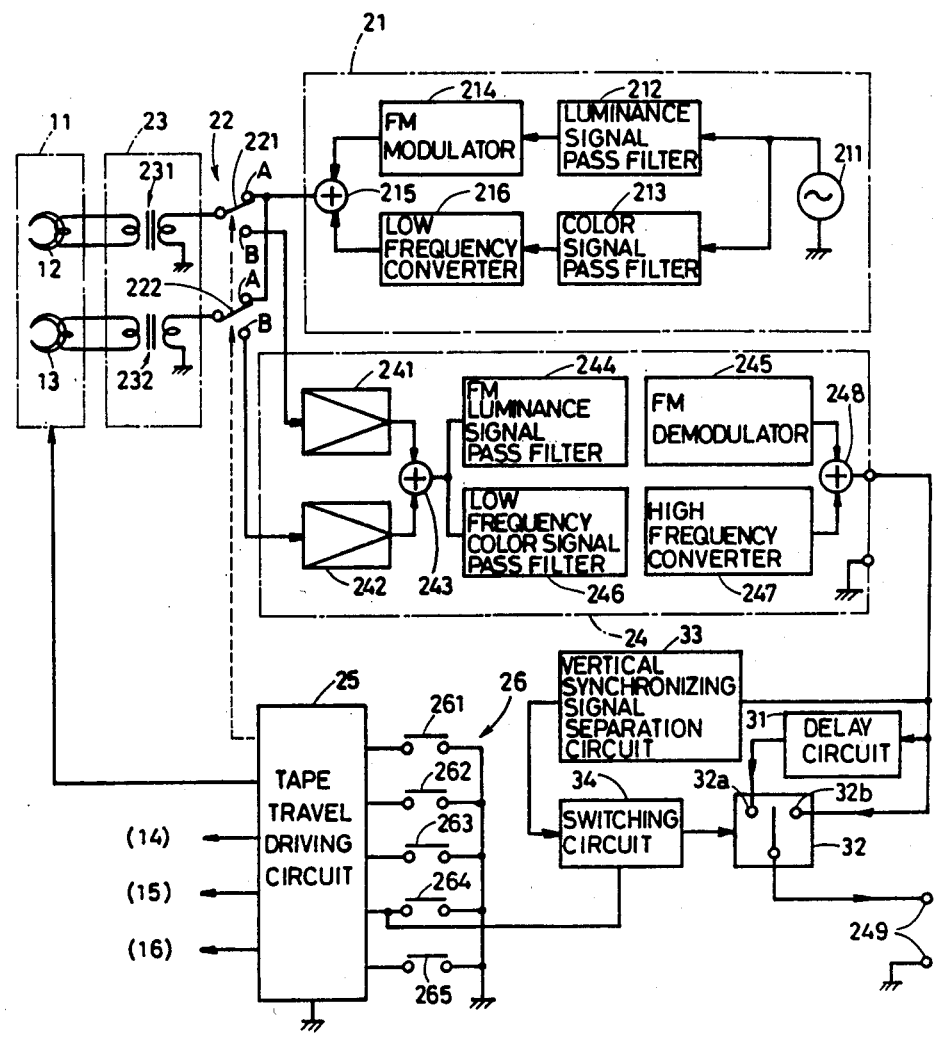
FIG. 4 is a circuit diagram of an embodiment of the present invention.

FIG. 4 is a schematic block diagram showing an embodiment of the present invention. Referring to FIG. 4, components identical to those in the prior art as explained with reference to FIG. 2 are indicated by the same reference numerals, and explanation thereof is herein omitted. The feature of the embodiment as shown in FIG. 4 resides in that a delay circuit 31, a changeover switch 32, a vertical synchronizing signal separation circuit 33 and a switching circuit 34 are provided between the output side of a reproducing system block 24 and a composite video signal output terminal 249. The delay circuit 31 is formed by, e.g., a semiconductor memory. The delay circuit 31 performs analog-to-digital conversion of the reproduced composite video signal outputted from an adder 248 to store the digital signal in the semiconductor memory, and after a predetermined period of time, it performs digital-to-analog conversion of the stored contents to output the same. The delay time is preferably in an integral multiple of a horizontal scanning period, and for the period of about one field. Thus, the signals are outputted from the delay circuit 31 in a delay for the period of about one field, i.e., about 1/60 seconds.

The output from the delay circuit 31 is supplied to one contact 32a of the changeover switch 32 while the output from the adder 248 is supplied to the other contact 32b of the changeover switch 32. The changeover switch 32 switches these two contacts 32a and 32b, i.e., the reproduced composite video signal directly supplied from the adder 248 and that delayed for the period of about one field, to output the same to the composite video signal output terminal 249.

Timing of the switching operation by the changeover switch 32 is now described. The vertical synchronizing signal separation circuit 33 receives the reproduced composite video signal from the reproducing system block 24 to separate vertical synchronizing signal from the same. The separated vertical synchronizing signal is fed to the switching circuit 34. When a fast reproduction command switch 264 is pushed down, the switching circuit 34 is supplied with a signal indicating the pushdown. Upon receiving the signal from the fast reproduction command switch 264, the switching circuit 34 outputs a switching signal to the changeover switch 32 in a predetermined period of timing synchronized with the vertical synchronizing signal fed from the vertical synchronizing signal separation circuit 33. During the period when the switching signal is outputted, the changeover switch 32 is switched to the contact 32a, and during the period when the switching signal is not outputted, the changeover switch 32 is switched to the contact 32b.

Explanation is now made with respect to the timing period of the switching signal outputted from the switching circuit 34.

Figure 1:
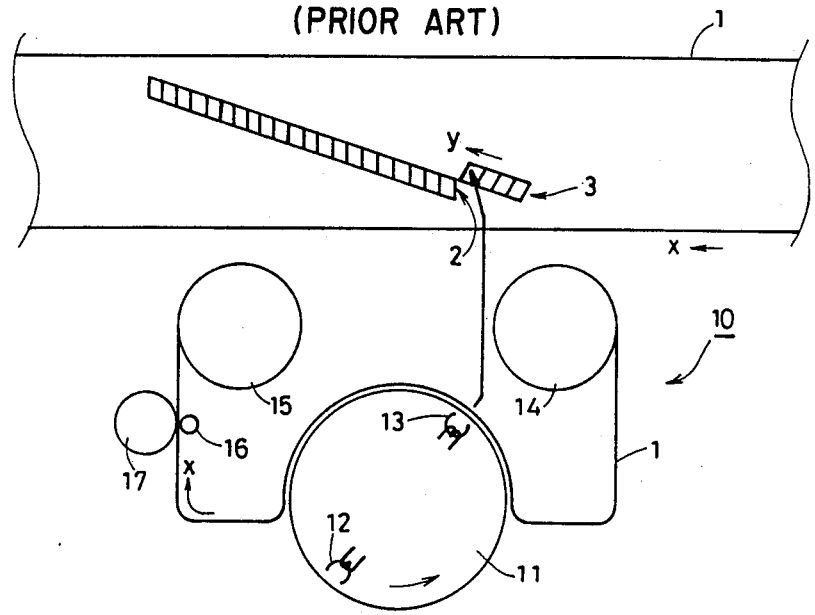
FIG. 1 is an illustration showing a video recording portion of a conventional magnetic video reproducing apparatus and a magnetic tape in which a video signal is recorded by the conventional video recording portion.
Figure 3:
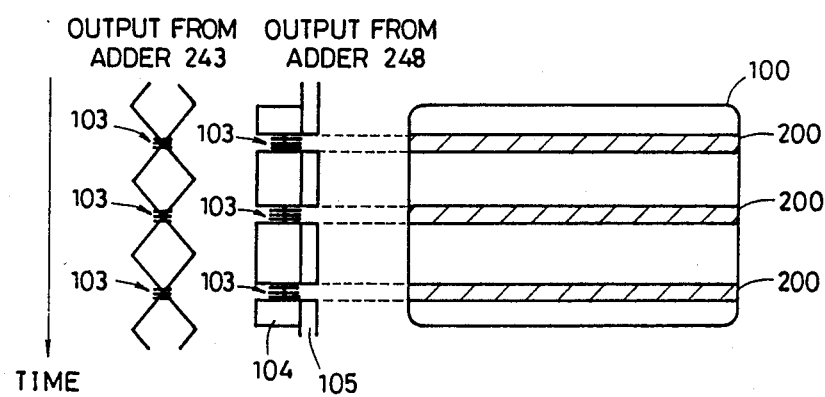
FIG. 3 is an illustration showing a relation between the signal reproduced by the conventional magnetic video reproducing apparatus and noises appearing on the screen of a monitor television.
Figure 5:
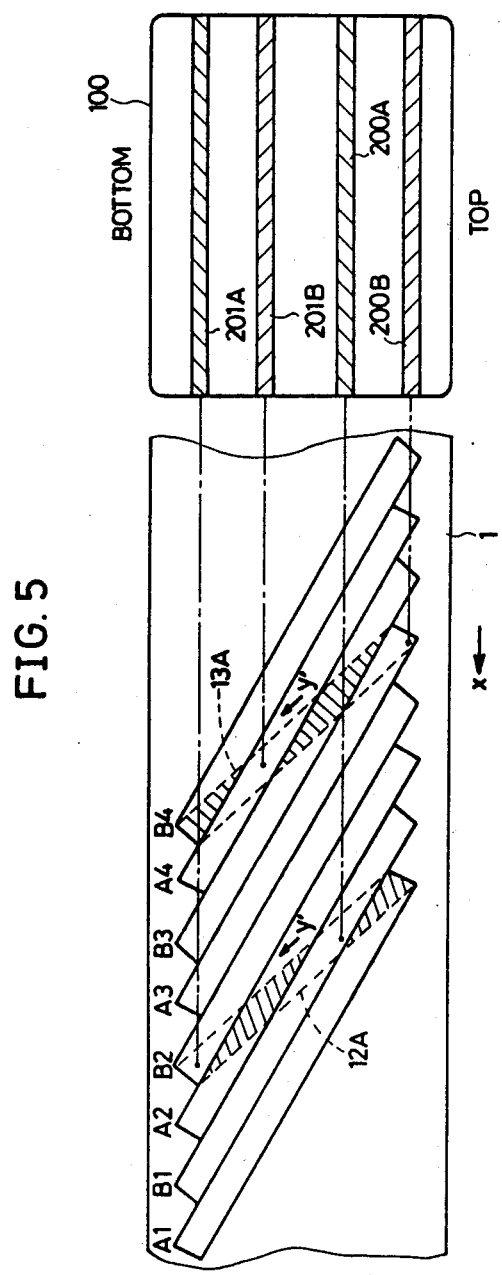
FIG. 5 is an illustration showing a relation between recording tracks and head traces in fast reproducing operation as well as noises appearing on the screen of a monitor television during the operation.

FIG. 5 is an illustration showing a relation between head traces on a magnetic tape 1 and noises appearing on the screen 100 of a monitor television in a case where the speed of fast reproducing operation is set to be four times faster than the recording speed. In FIG. 5, characters A1, A2, A3 and A4 indicate tracks on which signals are recorded by a video head 12 (see FIGS. 1 and 4), and the characters B1, B2, B3 and B4 indicate tracks on which signals are recorded by a video head 13. The numerals 12A and 13B indicate video head traces in the fast reproducing operation at the speed four times faster than the recording speed, in which the numeral 12A is for the trace of the video head 12 and the numeral 13B is for the trace of the video head 13. Thus, when the fast reproducing operation is made at the speed four times faster than the recording speed, each of the video heads 12 and 13 traces slantingly across four tracks. The character Y' indicates the scanning direction of each of the video heads 12 and 13 in the fast reproducing operation.

Since the video heads 12 and 13 respectively reproduce signals on the tracks having identical azimuth angles alone, the signals reproduced by the video heads 12 and 13 are those in hatched track portions in FIG. 5. As seen from the trace 12A, when the video head 12 crosses the track B1 for shifting from the track A1 to the track A2 and when the same crosses the track B2 upon completion of tracing on the track A2, the video head 12 cannot reproduce the signals and the outputs thereof are lowered, leading to appearance of noises. These noises appear on the screen 100 of the monitor television as indicated by the numerals 200A and 201A in FIG. 5. Namely, the noises 200A and 201A appear in a portion one third from the upper part of the monitor screen 100 and the lower end portion of the same respectively. It is to be noted that the monitor screen 100 is shown upside down in FIG. 5 for correspondence with the direction Y' of tracing on the magnetic tape 1. The vertical synchronizing signals are recorded in the lowermost end portions of the tracks.

Similarly, with respect to the signals reproduced by the video head 13, screen noises 200B and 201B appear in the upper part of the monitor screen 100 and in a portion one third from the lower portion of the same respectively.

Thus, when the reproduced composite video signal reproduced at a high speed four times faster than the recording speed is directly outputted to the monitor screen 100, there appear the screen noises 200A, 201A, 200B and 201B on the screen 100. According to the present embodiment, therefore, the reproduced composite video signal from the adder 248 and the reproduced composite video signal delayed for the period of one field are switched at the timing as hereinafter described.

The following description is made with reference to FIGS. 4 and 5. When the reproduced composite video signal is outputted from the adder 248 by the output from the video head 13, the delay circuit 31 generates the reproduced composite video signal reproduced by the video head 12 in the delay for the period of one field. Comparing the output from the video head 12 with that from the video head 13, the timing in which the noises appear in each of the outputs lags at regular intervals as obvious from FIG. 5, and the noises appear in the period of one field in the outputs from the video head 12 at a portion one third from the beginning end and at the terminating end portion. In the output from the video head 13, to the contrary, the noises appear in the period of one field at the beginning end portion and at a portion two third from the beginning end. Thus, the noises included in the outputs from the video heads 12 and 13 appear in portions different from each other, and comparing the output from the video head 13 at a certain instant with the output from the video head 12 delayed by the period of one field therefrom, no noise appears in the output from the video head 12 in a case where the noises appear in the output from the video head 13, and vice versa. Therefore, the noises can completely be eliminated from the output signals by switching the outputs from the video head 13 and those from the video head 12 in the delay for the period of one field alternately at appropriate intervals.

Since, in the concrete, the vertical synchronizing signal separation circuit 33 outputs the vertical synchronizing signal when the video head 13 detects the vertical synchronizing signal stored in the lower end portion of the head trace 13B, the switching circuit 34 is adapted to generate a switching signal within ranges up to about 1/6 of the period of one field and from about 3/6 to 5/6 of the same in the fast reproducing operation at the speed four times faster than the recording speed. Since the changeover switch 34 is thus switched to the terminal 32a during generation of the switching signal, the output from the delay circuit 31 is extracted to the output terminal 249 during this period. Thus, the output from the video head 13 including the noises during the subject period is not extracted to the output terminal 249, which generates the output signal including no noise.

The difference in reproduced picture between the reproduced composite video signal outputted from the adder 248 and that delayed by the period of one field by the delay circuit 31 can be disregarded in practice and causes no problem since the delay time is in the extremely short period of about one field. Even if the delay time is set for a period of about several fields, there is caused no problem.

Although the tape travelling speed for the fast reproducing operation is set to be four times faster than that for the recording operation, such a tape travelling speed is not restricted to the speed four times faster than the recording speed, and may be selected to be in an even multiple thereof. This is because the noises included in the outputs from the video head 12 and those included in the outputs from the video head 13 appear at timing lagging from each other in case of the speed in the subject even multiple. Since, when the tape travelling speed for the fast reproducing operation is set in an even multiple of the recording speed other than four times, positions and numbers of noises appearing in the output signal vary with the speed, the timing for the switching operation between the reproduced composite video signal directly outputted form the adder 248 and that delayed in the delay circuit 31 may be appropriately adapted to the same. It is to be noted that a positional relation between the noises in the reproduced composite video signal directly outputted from the adder 248 and that in the reproduced composite video signal outputted through the delay circuit 31 can readily be confirmed by an illustration as shown in FIG. 5.

Although the time delayed by the delay circuit 31 is for the period of about one field in the aforementioned embodiment, the delay time is not restricted to the subject period, and may be set for the period of a desired number of fields.

It is to be noted that the delay time is set to be in an integral multiple of the horizontal scanning period and for the period of about one field or about a desired number of fields, and not of completely one field or a certain desired number of fields for the following reason: Since the one field interval is 262.5 times as long as the horizontal scanning period, the output from the delay circuit 31 and the reproduced composite video signal directly outputted from the adder 248 are displayed on the monitor screen 100 in a time lag by half as the horizontal scanning period when the delay time is completely in coincidence with the one field interval, whereby skews appear on the monitor screen 100. Thus, the delay time delayed by the delay circuit 31 is set to be in an integral multiple of the horizontal scanning period and for the period of about a desired number of fields for preventing appearance of such skews. More specifically, the delay time is in an integral multiple of the horizontal scanning period within the period of a desired number of fields.

The output from the delay circuit 31 may be adapted to change in the horizontal scanning period of the reproduced composite video signal caused by irregular rotation of a head drum 11 to which the video heads 12 and 13 are mounted or the like to finely change the delay time thereby to correct the skews accompanying the irregular rotation of the head drum 11 in high accuracy.

Further, although the switching circuit 34 is driven based on the synchronizing signal detected by the vertical synchronizing signal separation circuit 33 in the embodiment as shown in FIG. 4, the switching circuit 34 may be driven in synchronization with the rotation of the head drum 11 to obtain a similar effect since the rotation of the head drum 11 is generally synchronized with the vertical synchronizing signal.

It is to be noted that, although the embodiment has been described with respect to a magnetic video reproducing apparatus including a recording system block 21, the present invention may also be applied to a magnetic video reproducing apparatus having a reproducing function alone.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic video reproducing apparatus capable of reproducing a video signal recorded in a recording medium at a normal reproducing speed and at a fast reproducing speed faster than said normal reproducing speed, said reproducer
    employing a rotating head system in which a plurality of video heads (12, 13) are mounted on the circumference of a rotating drum (11),
    a helical scanning system in which said recording medium is adapted to travel slantingly with respect to the direction of rotation of said video heads (12, 13), and an azimuth system in which said plurality of video heads (12, 13) have gaps provided at azimuth angles different from each other, said recording medium having recorded a composite video signal including a vertical synchronizing signal, said magnetic video reproducing apparatus including:

a capstan for mechanically driving said recording medium;

driving control means (25) for driving said capstan at a normal reproducing mode or at a fast reproducing mode;

mode selection means (26) coupled to said driving control means (25) for providing a signal for selecting either said normal reproducing mode or said fast reproducing mode wherein said fast reproducing speed in said fast reproducing mode is an even multiple of said reproducing speed in said normal reproducing mode;

reproducing means (24) coupled to said video heads (12, 13) for performing reproduction processing of signals read by said video heads (12, 13) from said recording medium thereby to output a reproduced composite video signal;

delay means (31) coupled to said reproducing means (24) for delaying said reproduced composite video signal for a predetermined period of time thereby to output a delayed reproduced composite video signal;

vertical synchronizing signal generating means (33) for generating a vertical synchronizing signal in synchronization with said vertical synchronizing signal included in said composite video signal; and switching means (32, 34) coupled to said reproducing (24) means and said delay means (31), as well as coupled to said mode selection means (26) and said vertical synchronizing signal generating means (33) for selectively passing said reproduced composite video signal or said delayed composite video signal at regular intervals in synchronization with said vertical synchronizing signal from the vertical synchronizing signal generating means when supplied with said signal for selecting said fast reproducing mode.

2. A magnetic video reproducing apparatus in accordance with claim 1, wherein said rotating head system is a rotating two-head system in which two heads (12, 13) are mounted on the circumference of said rotating drum (11), said two heads (12, 13) being separated from each other at an angle of 180°.

3. A magnetic video reproducing apparatus in accordance with claim 2, wherein said vertical synchronizing signal generating means (33) is coupled to said reproducing means (24) for separating said vertical synchronizing signal from said reproduced composite video signal outputted from said reproducing means and outputting the same.

4. A magnetic video reproducing apparatus in accordance with claim 3, wherein said predetermined period of time delayed by said delay means (31) is in an integral multiple of a horizontal scanning period and for the period of about a desired number of fields.

5. A magnetic video reproducing apparatus in accordance with claim 4, wherein said period of a desired number of fields is the period of one field.

6. A magnetic video reproducing apparatus in accordance with claim 3, wherein said switching means has a first input terminal (32b) for receiving said reproduced composite video signal, a second input terminal (32a) for receiving said delayed reproduced composite video signal, a changeover switch (32) having an output terminal (249), a vertical synchronizing signal separation circuit (33) for receiving said reproduced composite video signal and separating said vertical synchronizing signal from said reproduced composite video signal, and a switching circuit (34) for receiving said vertical synchronizing signal from said vertical synchronizing signal separation circuit (33) and outputting a switching signal at predetermined periods of timing in synchronization with said vertical synchronizing signal upon receiving a fast reproduction command signal, thereby to switch relation of connection between said first input terminal (32b) and said output terminal (249) or that between said second input terminal (32a) and said output terminal (249) in said changeover switch (32).

7. In a magnetic video reproducing apparatus capable of reproducing a video signal recorded in a recording medium at a normal reproducing speed and at a fast reproducing speed faster than said normal reproducing speed, wherein said reproducer employs a rotating head system in which a plurality of video heads are mounted on the circumference of a rotating drum, a helical scanning system in which said recording medium is adapted to travel slantingly with respect to the direction of rotation of said video heads, and an azimuth system in which said plurality of video heads have gaps provided at azimuth angles different from each other, and said recording medium having recorded a composite video signal including a vertical synchronizing signal, a capstan for mechanically driving said recording medium;

driving control means for driving said capstan at a normal reproducing mode or at a fast reproducing mode;

mode selection means coupled to said driving control means for providing a signal for selecting either said normal reproducing mode or said fast reproducing mode;

a method for eliminating noise bands in a composite video signal comprising the steps of:

reproducing the composite video signal from the recording medium;

delaying said reproduced composite video signal for a predetermined period of time;

outputting said delayed reproduced composite video signal;

generating a vertical synchronizing signal in synchronization with the vertical synchronizing signal included in said composite video signal; and selectively passing said reproduced composite video signal or said delayed composite video signal at regular intervals in synchronization with said synchronizing signal when said fast reproducing mode is selected, wherein said fast reproducing speed in said fast reproducing mode is an even multiple of said reproducing speed in said normal reproducing mode.

* * * * *